UNITED STATES PATENT OFFICE.

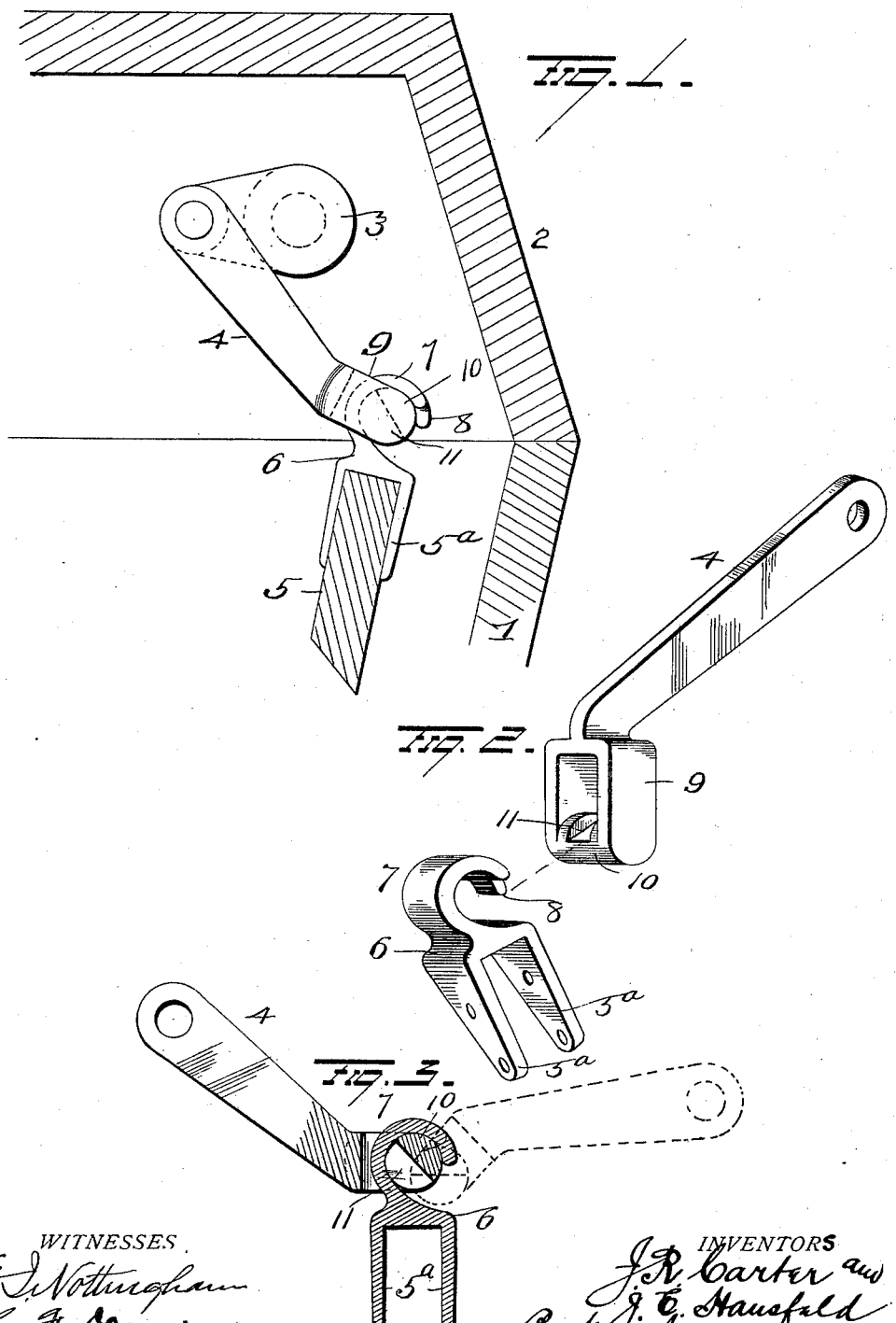

JOHN R. CARTER, OF AUGUSTA, KENTUCKY, AND JOSEPH E. HAUSFELD, OF CINCINNATI, OHIO, ASSIGNORS TO ERNST H. HUENEFELD, OF CINCINNATI, OHIO.

COUPLING.

SPECIFICATION forming part of Letters Patent No. 707,674, dated August 26, 1902.

Application filed December 23, 1901. Serial No. 86,957. (No model.)

*To all whom it may concern:*

Be it known that we, JOHN R. CARTER, of Augusta, in the county of Bracken and State of Kentucky, and JOSEPH E. HAUSFELD, of Cincinnati, in the county of Hamilton and State of Ohio, have invented certain new and useful Improvements in Couplings; and we do hereby declare the following to be a full, clear, and exact description of the invention, such as will enable others skilled in the art to which it appertains to make and use the same.

Our invention relates to an improvement in couplings, and more particularly to an improved pitman connection which will permit of the ready connection and disconnection of the pitman when in one position, but which cannot be disconnected when in any but said position.

With this object in view the invention consists in certain novel features of construction and combinations and arrangements of parts, as will be more fully hereinafter described, and pointed out in the claims.

In the accompanying drawings, Figure 1 is a view of a portion of a washing-machine, showing our improvements thereon. Fig. 2 is a perspective view of the two parts forming the coupling, and Fig. 3 is a view in section of the coupling.

1 represents the body of a washing-machine, and 2 the cover therefor, in which a crank-shaft 3 is mounted, as shown. A pitman 4 connects the rubber 5 of the washer with the crank-shaft, and it is this connection between the pitman and the rubber that constitutes our present invention, which will now be described. To one end of the lower rubber the bifurcated lower portion 5ª of the member 6 is secured by screws or bolts, and its upper portion consists of an integral bearing 7, open in one side and made with a depending tongue 8 integral with the bearing and curved in the same radius as the bearing.

The pitman 4 is provided on its end with an integral slotted enlargement 9, located at an angle thereto and provided in its end with an integral cylindrical journal 10, which is of approximately the same diameter as the bearing 7, so as to fit therein and turn without undue noise. This journal 10 is provided centrally on its side (in the slotted portion of the enlargement 9) with a recess or groove 11 of approximately the same width as the tongue 8 and of sufficient depth to receive the tongue when the pitman is in the position shown in dotted lines in Fig. 3, and hence permit the journal to be inserted in the bearing 7. When the journal is so inserted and the pitman swung to its operative position or to any position other than that indicated, the journal will be turned far enough to prevent the passage of the same beneath the tongue, and hence absolutely prevent accidental disconnection of the parts. When the connection is made and the parts are in operation, the full width of the bearing and the tongue are utilized to withstand the strain of the plunging action of the pitman, and as the groove or recess 11 is not as wide as the journal the circular shoulders left in the bifurcated portion of the enlargement are overlapped by the bearing to further strengthen the coupling.

We might, if desired, provide an integral central strengthening web or disk in the bearing and sever the journal to receive the same, and thus strengthen the coupling, and various other slight changes and alterations might be resorted to in the general form and arrangement of the several parts set forth without departing from our invention, and hence we do not wish to be limited to the precise details set forth, but consider ourselves at liberty to make such slight changes and alterations as fairly fall within the spirit and scope of our invention.

Having fully described our invention, what we claim as new, and desire to secure by Letters Patent, is—

1. A coupling comprising two members, one member having a journal provided with a transverse groove, and the other member having an open bearing provided at one end with a tongue concentric with and having a bearing on said journal.

2. A coupling consisting of two members, one having a bearing thereon open on one side and a tongue projecting from one end of said open portion, the other member having a journal grooved or recessed to allow the passage of the tongue and permit the insertion of the journal into the bearing.

3. A coupling consisting of two members, one having a bearing thereon open on one side and an integral tongue projecting from said bearing, the other member comprising a pitman having a slotted enlargement at one end projecting at an angle thereto, a journal extending across the bifurcated end of the pitman and grooved or recessed in one side to receive the tongue when alined therewith and permit the insertion of the journal into the bearing.

4. The combination with a device to be moved and a crank-shaft, of a pitman connected at one end to the crank-shaft, a journal at the other end of said pitman, a bearing secured to said device open in one side and having a tongue projecting therefrom and said journal grooved to permit its insertion into the bearing when the pitman is disposed so as to aline the groove with the tongue on the bearing.

In testimony whereof we have signed this specification in the presence of two subscribing witnesses.

JOHN R. CARTER.
JOSEPH E. HAUSFELD.

Witnesses:
  E. HUESMAN,
  J. P. BAUER, Jr.